(12) United States Patent
Oh (10) Patent No.: US 7,027,636 B2
(45) Date of Patent: Apr. 11, 2006

(54) METHOD OF DETECTING MEASUREMENT ERROR IN MEASUREMENT SYSTEM

(75) Inventor: Seok-Hwan Oh, Youngin (KR)

(73) Assignee: Samsung Electronics Co., Ltd., Suwon (KR)

( * ) Notice: Subject to any disclaimer, the term of this patent is extended or adjusted under 35 U.S.C. 154(b) by 634 days.

(21) Appl. No.: 09/983,741

(22) Filed: Oct. 25, 2001

(65) Prior Publication Data

US 2002/0081016 A1    Jun. 27, 2002

(30) Foreign Application Priority Data

Nov. 9, 2000    (KR)    .............................. 2000-66333

(51) Int. Cl.
*G06K 9/00*    (2006.01)

(52) U.S. Cl. .............. 382/145; 382/100; 250/306; 250/252.1; 356/401

(58) Field of Classification Search ............... 382/100, 382/145, 141; 355/18, 77, 53; 73/73, 105; 365/399, 401, 394, 388, 400, 391, 392; 216/63, 216/67; 438/14, 16, 17, 18, 714; 235/90, 235/95,493; 250/306, 252.1, 307, 310, 491.1; 700/121; 257/14, 773, 734; 356/401

See application file for complete search history.

(56) References Cited

U.S. PATENT DOCUMENTS

| | | | | |
|---|---|---|---|---|
| 5,952,132 | A * | 9/1999 | King et al. | 430/22 |
| 6,312,963 | B1 * | 11/2001 | Chou et al. | 438/18 |
| 6,317,211 | B1 * | 11/2001 | Ausschnitt et al. | 356/401 |
| 6,373,053 | B1 * | 4/2002 | Choo et al. | 250/310 |
| 6,449,031 | B1 * | 9/2002 | Grodnensky et al. | 355/77 |
| 6,452,677 | B1 * | 9/2002 | Do et al. | 356/394 |
| 6,573,497 | B1 * | 6/2003 | Rangarajan et al. | 250/306 |

* cited by examiner

Primary Examiner—Sheela Chawan
(74) Attorney, Agent, or Firm—Lee & Morse, P.C.

(57) ABSTRACT

A method of detecting measurement errors in a measurement system includes: a) imaging a pattern, the imaged pattern including a plurality of critical dimension measurement dots, and b) automatically detecting a non-smooth connection of the plurality of the critical dimension measurement dots.

21 Claims, 10 Drawing Sheets

| | | |
|---|---|---|
| Measurement | | Action |
| Diameter(Hole) | | |

| Object | Outer Diameter | ← H |
| Kind | Radial | |
| Data | Area | Diameters (4~24) | 8 |
| Centering | ON | |

G points to "Area"

| Method | Threshold |
| Design Value (0.001-999.999) | 3.596 μm² |
| Search Area (10-150) | 80 | Smoothing (1-29(odd)) | 7 |
| Inspect Area (2-32(degreee)) | 32 | Differential (3-19(odd)) | 5 |

| | Left | Right |
|---|---|---|
| Threshold (0-100%) | 50 | 50 |
| Edge Number (1-5) | 1 | 1 |
| Base Line Start Point (-8,-4,-2,-1,1,2,4,8) | 2 | 2 |
| Base Line Area (1-16) | 3 | 3 |
| Edge Search Direction | Normal | Normal |

| Measurement Position | Free |

| OK | Apply | Cancel |

FIG. 11A $R^2 = 0.998$
$3\sigma = 0.139$

FIG. 11B $R^2 = 0.978$
$3\sigma = 0.403$

METHOD OF DETECTING MEASUREMENT ERROR IN MEASUREMENT SYSTEM

BACKGROUND OF THE INVENTION

1. Field of the Invention

The present invention relates to a measurement system and, more particularly, to a method of detecting measurement errors for critical dimension (CD) values of a pattern in a measurement system with a scanning electron microscope.

2. Description of the Related Art

Typically, there are two methods to measure critical dimension (CD) values: (1) a manual CD measuring method; and (2) an automatic CD measuring method. In the manual CD measuring method, an operator manually performs a CD measurement. Obtaining an accurate CD measurement with the manual CD measuring method requires a highly experienced operator. Therefore, the manual CD measuring method has problems in that the reliability of measured data depends on the skill of the operator. The automatic CD measuring method automatically detects an edge of a fine pattern using an image processing means and determines a CD of the pattern by data located at the edge.

In addition, as semiconductor devices become more highly integrated, demand for measurement of small-sized patterns increases, and a large amount of measured data is required for process stability. In order to obtain such data, measurement systems (or apparatuses) are automated.

Figure 1:
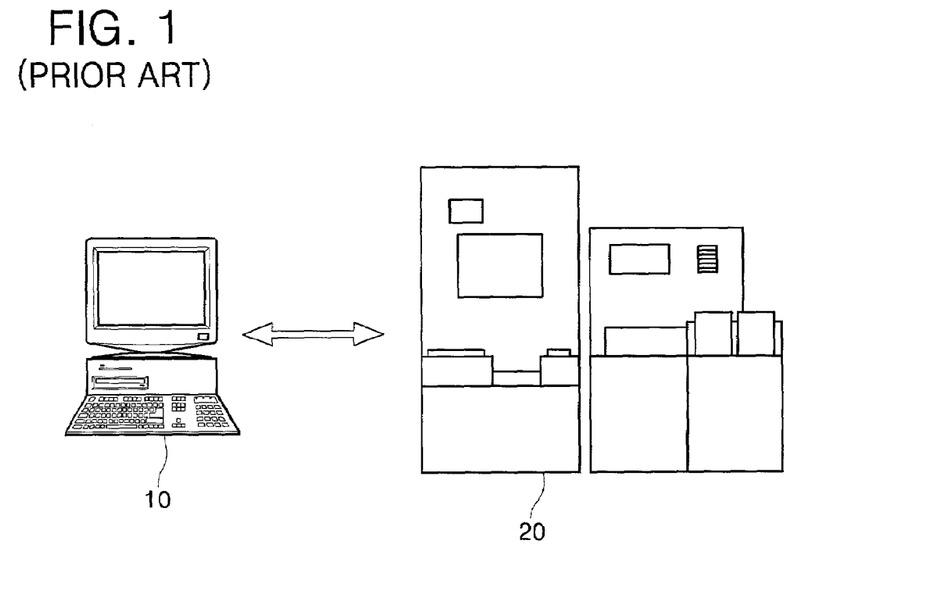
FIG. 1 illustrates a conventional automatic measurement system according to the prior art.

FIG. 1 illustrates a conventional automatic measurement system. Such an automatic measurement system of FIG. 1 may include a computer 10 and a scanning electron microscope 20. The computer 10 may include a monitor and a random access memory (RAM), wherein a software module having a function for measuring a critical dimension (CD) is stored.

In order to measure a CD value of a fine pattern, such as that formed on a semiconductor wafer, first the software in the computer 10 is executed to display a graphic user interface (GUI) on the monitor. The computer 10 controls the operation of the scanning electron microscope 20 to scan electron beams over the fine pattern. The computer 10 detects secondary electrons generated from the scanned portion of the pattern to create and display an image of the pattern on the monitor. Thereafter, a CD value (i.e., width and length) of the fine pattern may be measured.

Figure 2:
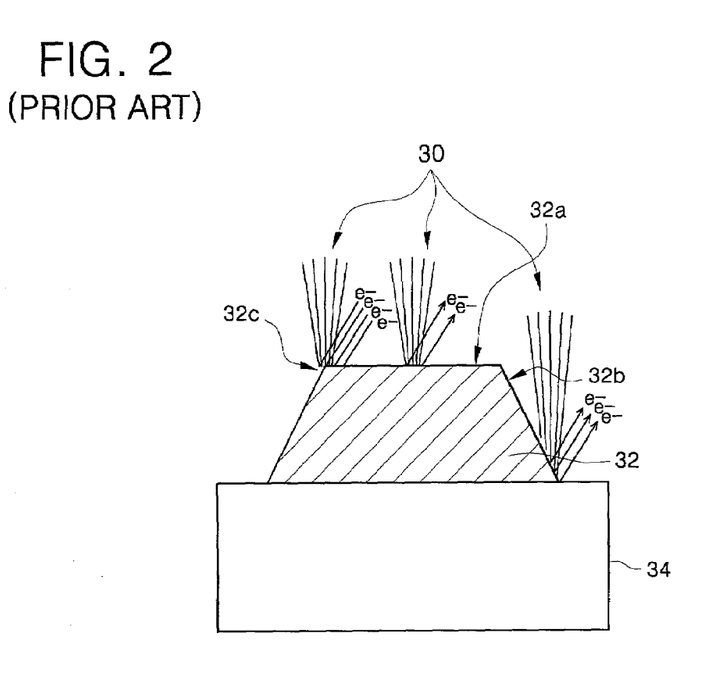
FIG. 2 illustrates a cross-sectional view of a semiconductor wafer showing a reflection/radiation pattern formed by the semiconductor wafer according to the prior art.

FIG. 2 illustrates a cross-sectional view of a semiconductor wafer showing a reflection/radiation pattern formed by a semiconductor wafer. In order to determine different image contrasts contained in a pattern 32, the electron beam is scanned over a flat portion 32a, a tapered portion 32b and an edge portion 32c of the pattern 32. When the electron beams 30 are scanned over flat portion 32a of a pattern 32 formed on a semiconductor wafer 34, relatively few secondary electrons "e⁻" are emitted. When the electron beams 30 are scanned over tapered portion 32b of the pattern 32, more secondary electrons "e⁻" are radiated at the tapered portion 32b than at the flat portion 32a. Further, when the electron beams 30 are scanned over an edge portion 32c of the pattern 32, more secondary electrons "e⁻" are radiated at the edge portion 32c than at the tapered portion 32b.

Brightness of an image of the pattern displayed on a monitor is proportional to the number of the radiated secondary electrons e⁻. In other words, a portion of the pattern that radiates a high number of secondary electrons e⁻ is displayed on a monitor of the computer with a relatively high brightness. Alternatively, a portion of the pattern that radiates fewer secondary electrons e⁻ is displayed on the monitor of the computer with a relatively low brightness. Therefore, the pattern image displayed on the monitor using contrasts represents the pattern over which the electron beam is scanned.

Figure 3:
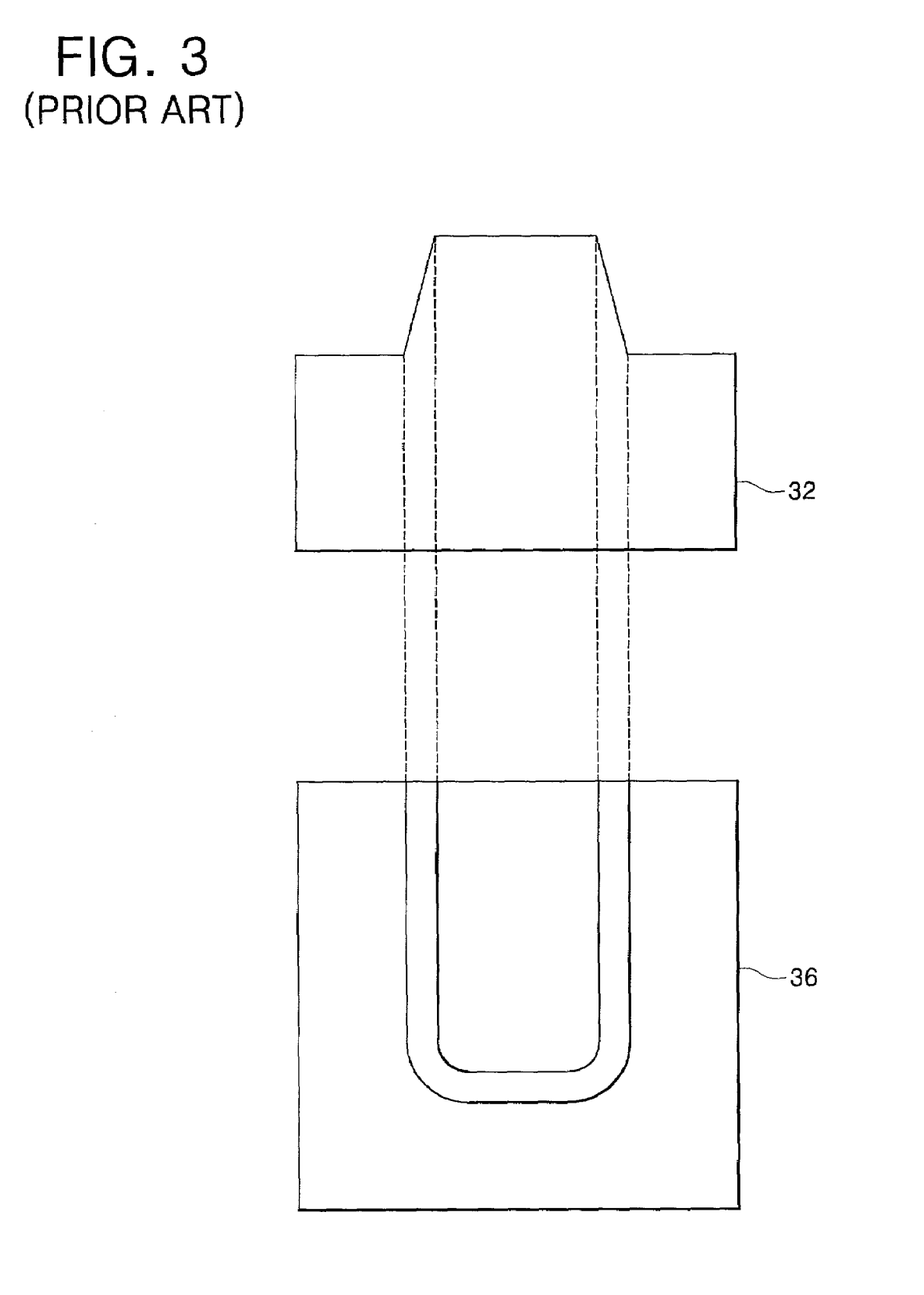
FIG. 3 illustrates an image of the pattern displayed on a monitor according to the prior art.

FIG. 3 illustrates an image of the pattern displayed on a monitor. As described above, the pattern 32 is displayed as an image on the monitor 36. Thereafter, a CD value of the pattern 32 can be measured.

In such a conventional automatic measurement system, it is very important to have reliable resulting data (i.e., CD value) measurements. For example, when measured data has measurement errors, the reliability of the measured data is reduced, and data that are not measured may be higher in reliability than the measured data. In addition, the conventional automatic measurement system merely measures the CD value of the image and then displays the CD value on a monitor, and thus there is no method for determining whether the measured CD value has errors. Therefore, reliability for the measured CD value is reduced.

SUMMARY OF THE INVENTION

To overcome the problems described above, the present invention provides a method of automatically determining whether CD data of a pattern measured by a measurement system contains measurement errors.

In a preferred embodiment of the present invention, a method is provided for detecting measurement errors in a measurement system. The method preferably includes: a) imaging a pattern, the imaged pattern including a plurality of critical dimension (CD) measurement dots, b) measuring a plurality of distances between a plurality of associated dot pairs from the plurality of the CD measurement dots, c) calculating an average value using the plurality of measured distances, d) calculating a square value of trend analysis $R^2$ using the average value, and e) detecting a non-smooth connection of the plurality of the CD measurement dots using $R^2$, wherein $R^2$ is obtained by the following equation:

$$R^2 = 1 - \frac{\sum (di - AVE)^2}{\sum di^2 - \frac{(\sum di)^2}{n}}, i = 1, \ldots, n \qquad [1]$$

wherein AVE is the average value, and di is the distance between the $i^{th}$ pair of associated dots.

Step (e) may include: setting a critical value and comparing $R^2$ with the critical value. A non-smooth connection may be detected when $R^2$ is less than the critical value. The method may further include, either after or before (e), detecting the non-smooth connection of the plurality of the CD measurement dots using a 3σ parameter where $$3_\sigma = 3 \times \sqrt{\frac{\sum (di - AVE)^2}{n}}, i = 1, \ldots, n \qquad [2]$$

wherein AVE is the average value, and di is the distance between the $i^{th}$ pair of associated dots.

The step of (e) may further include setting respective critical values of $R^{2\prime}$ and $3\sigma'$, and comparing calculated $R^2$ and $3\sigma$ values with the respective critical values. The non-smooth connection can be detected when $R^2$ is less than its critical value and $3\sigma$ is greater than its critical value.

An alternate embodiment of the present invention provides a method of detecting measurement errors in a measurement system. The method may include: a) imaging a pattern, the imaged pattern including a plurality of CD measurement dots, b) measuring distances between associated dot pairs from the plurality of the CD measurement dots, c) calculating an average value using the distances, d) calculating $3\sigma$ using the average value, and e) detecting a non-smooth connection of the plurality of CD measurement dots using $3\sigma$, wherein $3\sigma$ may be obtained using equation [2] above. Step (e) may include setting a critical value and comparing $3\sigma$ with the critical value. The non-smooth connection may be detected when $3\sigma$ is greater than the critical value.

Another alternate embodiment of the present invention provides a method of detecting measurement error, preferably comprising: a) providing a measurement system including a computer and a scanning electron microscope, the computer including a function for measuring a CD of a pattern, b) operating the computer to enable the scanning electron microscope to scan an electron beam over the pattern, so that secondary electrons are generated from the scanned portion of the pattern, c) detecting the generated secondary electrons to image and display the pattern on the computer, the imaged pattern on the computer including a plurality of CD measurement dots, d) measuring a CD using distances between associated dot pairs from the plurality of the CD measurement dots, e) obtaining $R^2$ and $3\sigma$ using the CD, and f) detecting automatically a non-smooth connection of the plurality of the CD measurement dots to determine if the CD has a measurement error.

A feature of the present invention provides a method of detecting measurement error, preferably comprising: a) imaging a pattern, the imaged pattern including a plurality of CD measurement dots; and b) detecting a non-smooth connection of the plurality of the CD measurement dots automatically.

The present invention has an advantage over the prior art in that the measurement system may automatically detect measurement error of a measured CD value, thereby increasing the reliability of measured CD values.

These and other features of the present invention will be readily apparent to those of ordinary skill in the art upon review of the detailed description that follows.

BRIEF DESCRIPTION OF THE DRAWINGS

For a more complete understanding of the embodiments of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Korean Patent Application No. 2000-66333, filed on Nov. 9, 2000, and entitled: "Measurement error detecting method of measurement apparatus using scanning electron microscope," is incorporated by reference herein in its entirety.

Reference will now be made in detail to preferred embodiments of the present invention, examples of which are illustrated in the accompanying drawings.

Figure 4A:
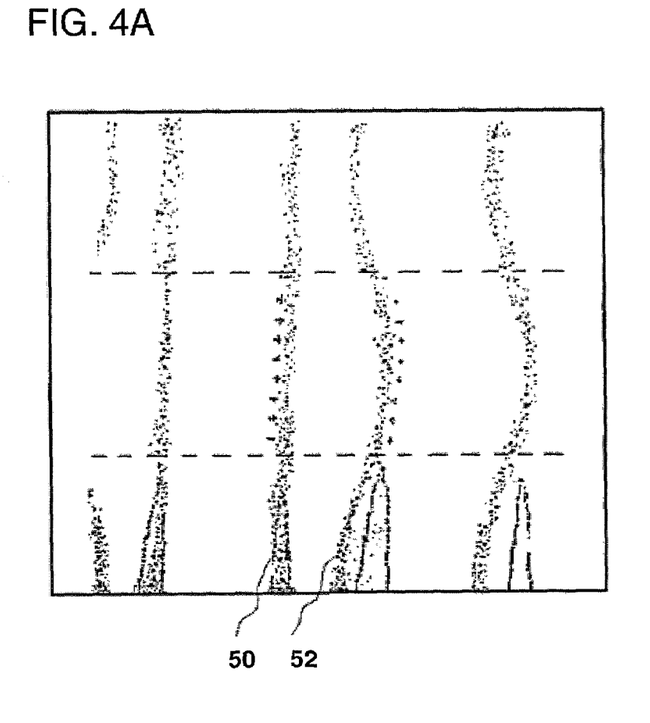
FIGS. 4A and 4B illustrate photographs of an image of a line pattern displayed on the monitor.
Figure 4B:
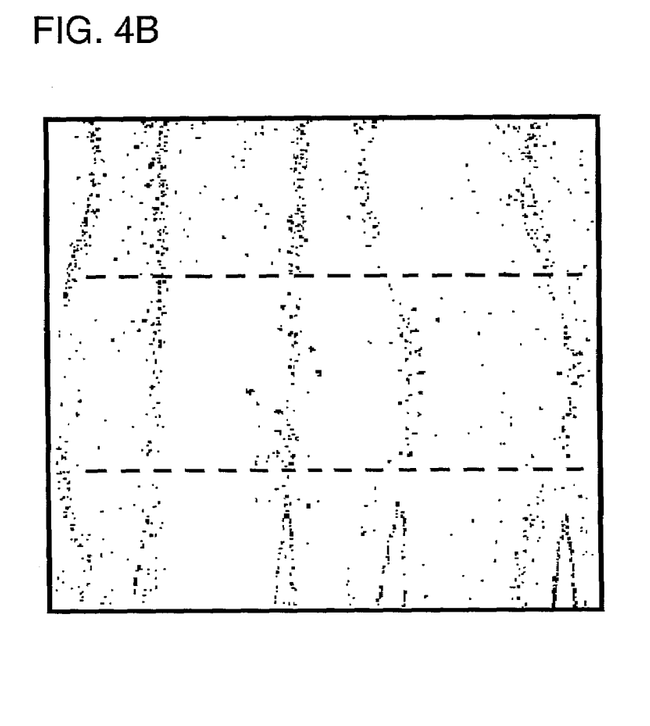

FIGS. 4A and 4B illustrate photographs of an image of a line pattern displayed on the monitor. In FIGS. 4A and 4B, indications "+" denote dots for a CD measurement. A connection between the "+"s of FIG. 4A could be indicated by smooth lines 50 and 52, but a connection between the "+"s of FIG. 4B would be non-smooth or dislocated.

Generally, in highly-integrated semiconductor devices, patterns seldom have non-smooth or dislocated portion. Therefore, the presence of a non-smooth or dislocated connection of the CD measurement dots "+" means that the CD value has errors. Thus, it may be deduced that the CD measurement dots "+" of FIG. 4A are properly set, but that the CD measurement dots "+" of FIG. 4B indicate errors.

Figure 5A:
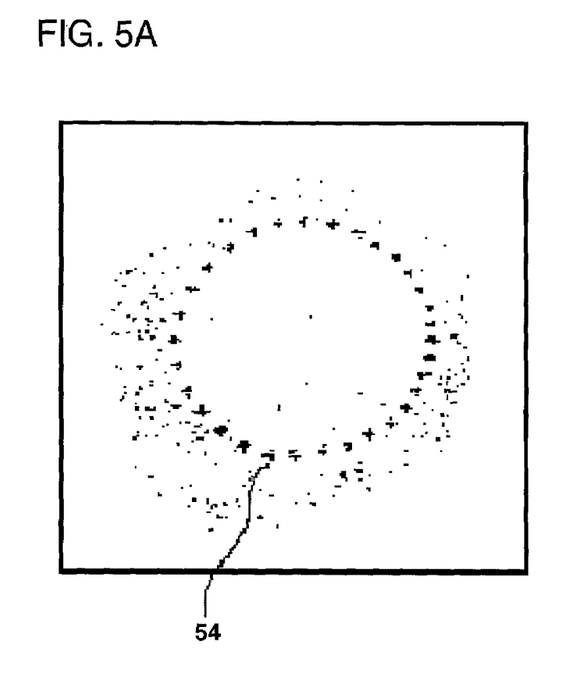
FIGS. 5A and 5B illustrate photographs of an image of a contact hole pattern displayed on the monitor.
Figure 5B:
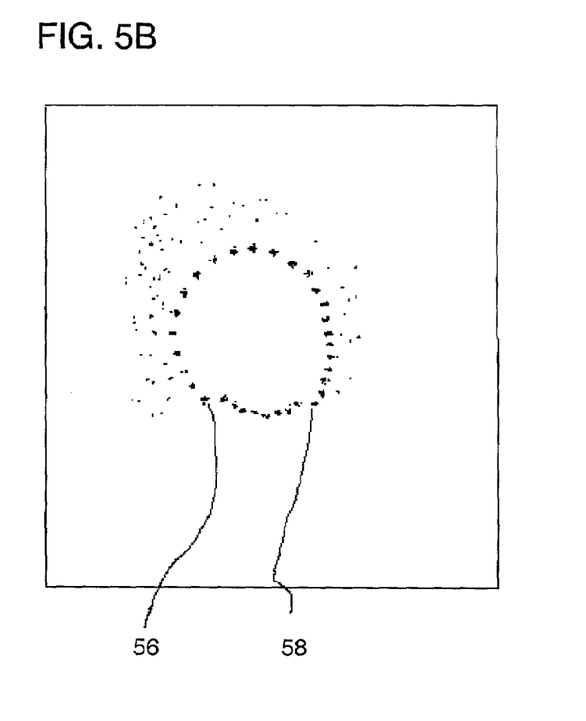

FIGS. 5A and 5B illustrate photographs of an image of a contact hole pattern displayed on the monitor. Like FIGS. 4A and 4B, the CD measurement dots "+" 54 of FIG. 5A are properly set, but the CD measurement dots "+" of FIG. 5B have errors because of a non-smooth or dislocated connection at locations 56 and 58.

According to the embodiments of the present invention, automatic determination of whether a measured CD value has errors may be accomplished by detecting a non-smooth or dislocated connection of the CD measurement dot pairs. In the above, associated dot pairs would preferably comprise adjacent dots.

There may be several methods for analyzing whether a connection of the CD measurement dot pairs is smooth or non-smooth (or dislocated).

Figure 6:
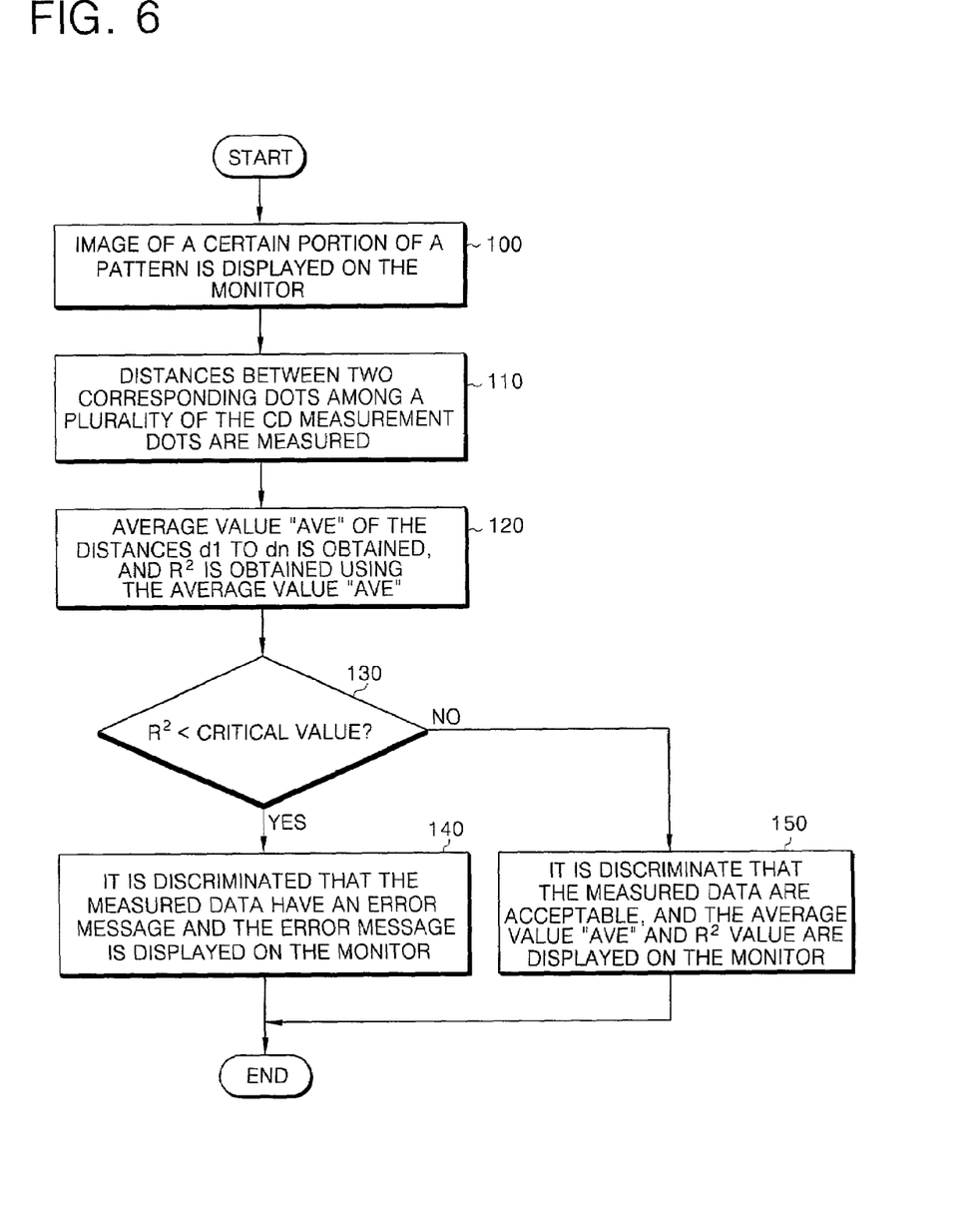
FIG. 6 illustrates a flow chart showing a method of detecting CD measurement errors according to a first preferred embodiment of the present invention.
Figure 7:
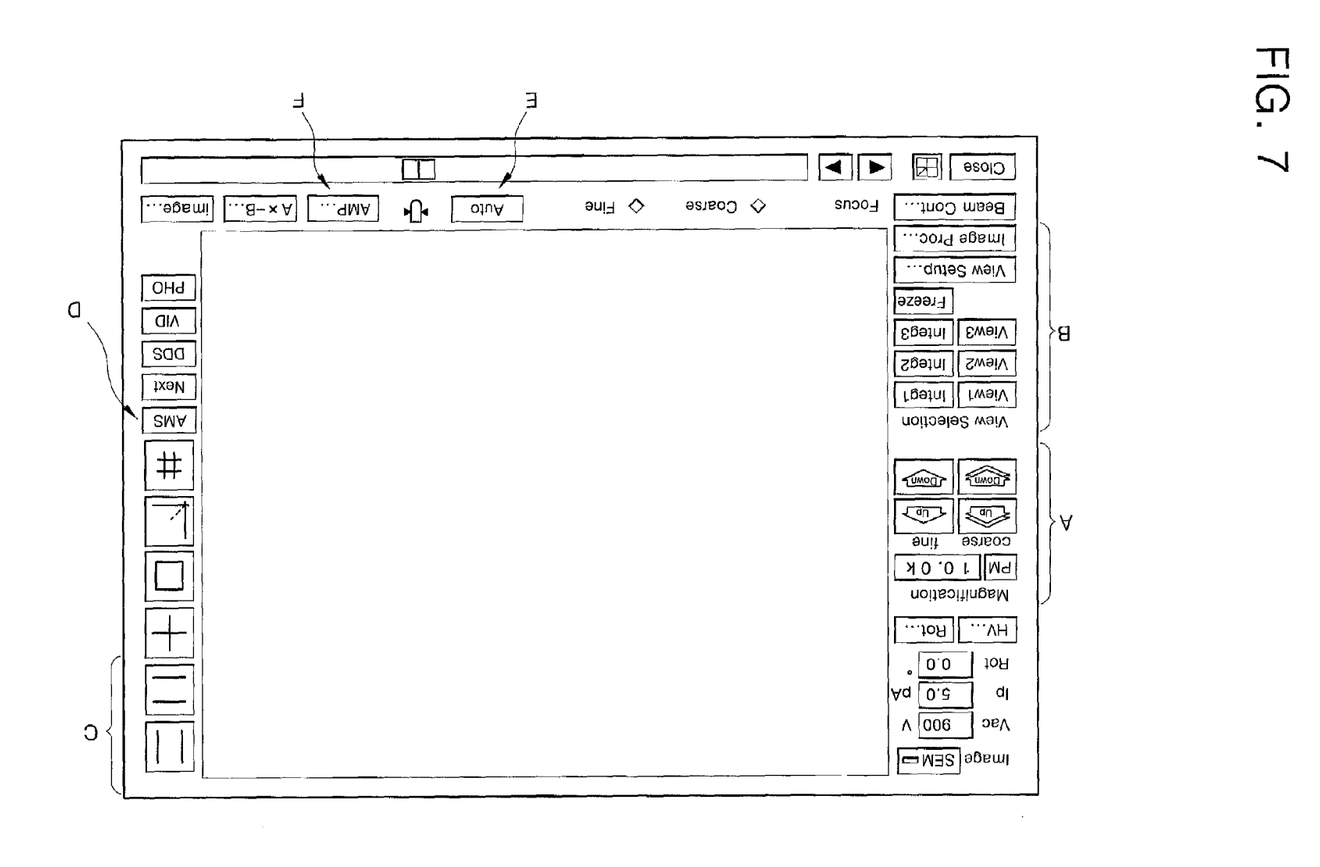
FIG. 7 shows an initial graphic user interface (GUI) screen when a CD measurement software is executed.
Figure 8:
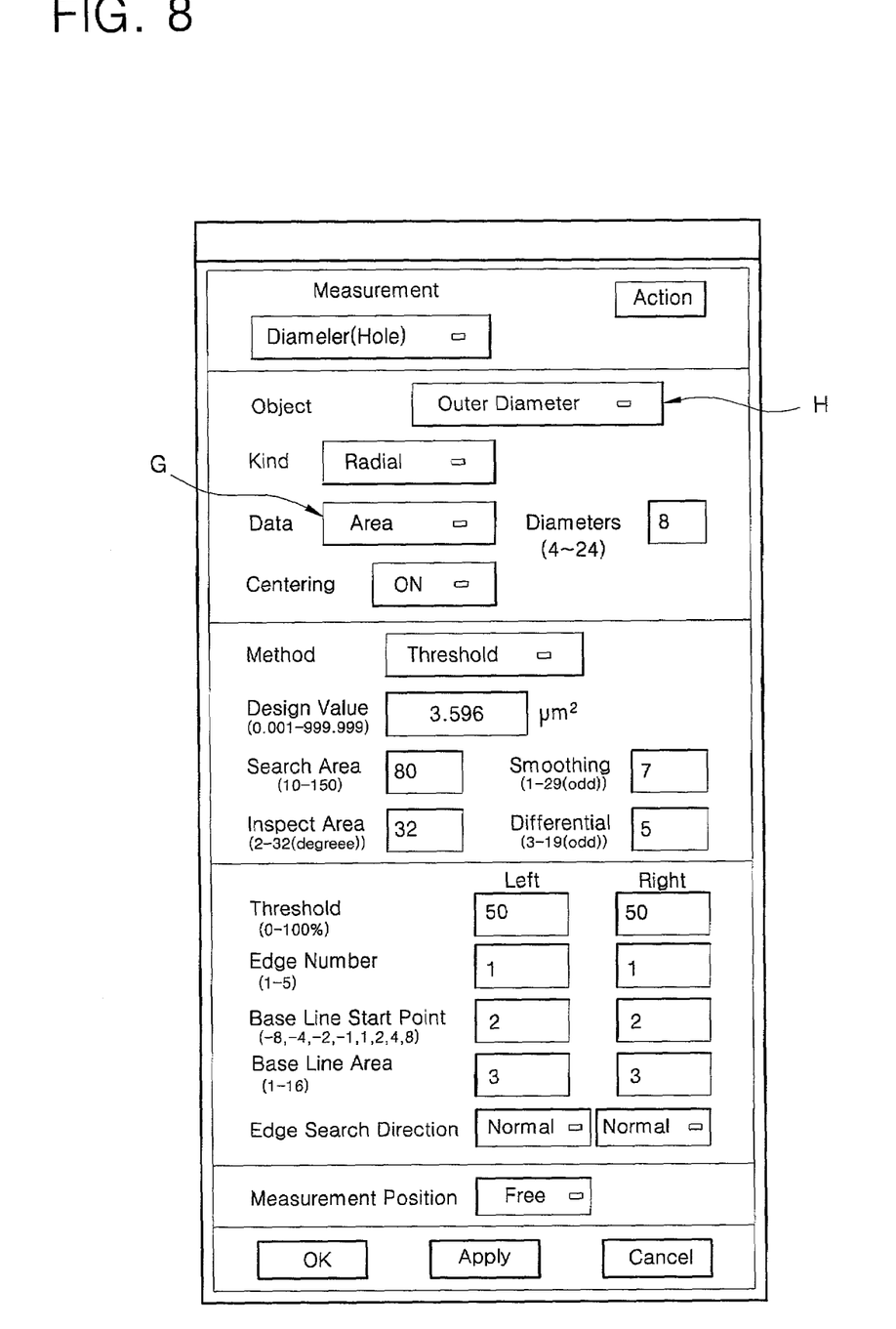
FIG. 8 shows the GUI to measure a diameter of a contact hole pattern.

FIG. 6 illustrates a flow chart showing one method for detecting CD measurement errors according to a preferred embodiment of the present invention. Steps 100 through 150 of FIG. 6 will be discussed in terms of interaction with the user selections made via a screen interface as shown in FIGS. 7 and 8. In order to measure a CD value, a CD measurement software module in the computer 10 is executed, so that a graphic user interface (GUI) of FIG. 7 is displayed on the monitor.

FIG. 7 shows an exemplary initial GUI having representative selection buttons. For example, a selection button group "A" may be used to magnify or to reduce an image. Another button group "B" may be used to set a display condition of the image. A further button group "C" may be used to manually measure a CD value. Yet another button D may be used to start an automatic CD measurement. Another button "E" may be used to automatically adjust a focus. Still another button "F" may be used to open a window to set automatic CD parameters.

After the GUI of FIG. 7 is displayed on the monitor, basic values for a CD measurement may be set. Thus, an image of a certain portion of a pattern is displayed on the monitor in compliance with the basic values (Step 100 of FIG. 6). The button D of FIG. 7 may be pressed to go to an automatic mode, so that a GUI of FIG. 8 may be displayed.

FIG. 8 shows a second GUI for measuring a diameter of a contact hole pattern. Even though the present invention is described as focusing on the contact hole pattern, the present invention may be applied to various shaped patterns such as the line patterns of FIGS. 4A and 4B. In FIG. 8, a button "G" may be used to specify the kind of a measurement value. For example, this value may be one or more from the group consisting of: a Y-directional diameter, an X-directional diameter, a major axis, a minor axis, and the like. Another button "H" may be used to set an inner diameter and an outer diameter of the contact hole pattern to be measured.

Distances between two dots selected from a plurality of the CD measurement dots (see "+"s in FIGS. 5A and 5B) may be measured in accordance with selected values set on the GUI of FIG. 8 (Step 110 of FIG. 6). Then, average value AVE of the distances between the selected dot pairs is calculated, and the square value of trend analysis $R^2$ may be calculated using the average value AVE (Step 120 of FIG. 6). The average value is a CD value.

In more detail, the average value, AVE, may be obtained by the equation $$AVE = \frac{d1 + d2 + \ldots + dn}{n} \quad [3]$$

wherein the distances between two associated dots among a plurality of dots are d1 to dn. $R^2$ may be obtained by Equation [1]. It should be noted that if $R^2$ is equal to 1, it means an ideal, or error-free, condition. As a value of $R^2$ approaches "0," the number of errors that have occurred increases. Thus, an operator can select a desired value for the critical value of $R^2$ as being between 0 and 1, depending on a particular performance criteria. Step 130 of FIG. 6 determines if $R^2$ is less than "1."

If $R^2$ is less than the critical value, it is determined to be in error, and an appropriate error message may be displayed on the monitor (step 140 of FIG. 6), thereby indicating that a connection of the CD measurement dots of the pattern is non-smooth or dislocated. Alternatively, if $R^2$ is greater than or equal to the critical value, the measured data are acceptable to the operator, and the average value AVE and $R^2$ value may be displayed on the monitor (Step 150 of FIG. 6).

Figure 9:
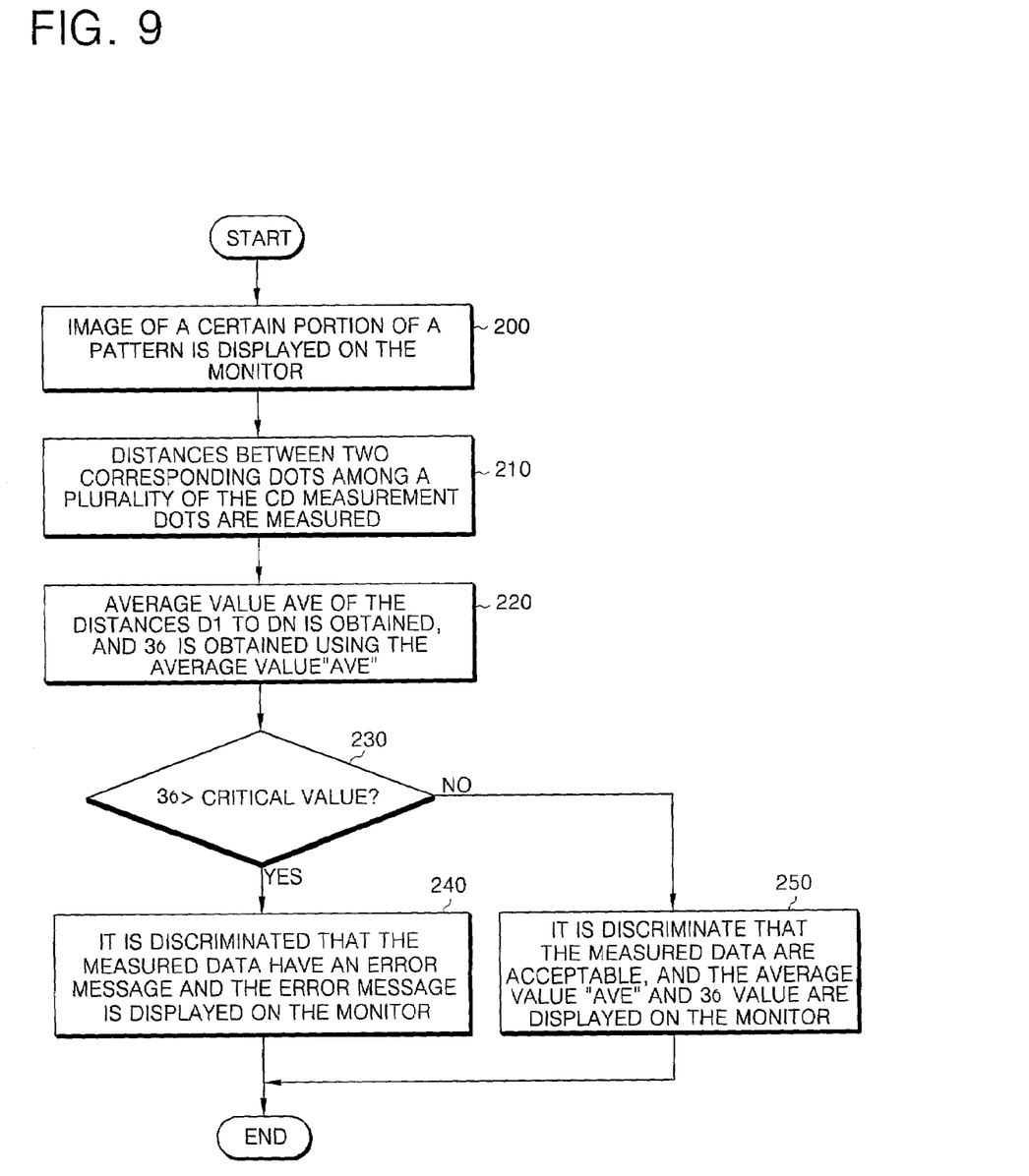
FIG. 9 illustrates a flow chart showing a method of detecting CD measurement errors according to a second preferred embodiment of the present invention.

FIG. 9 illustrates a flow chart showing a method of detecting CD measurement errors according to another preferred embodiment of the present invention. Steps 200 and 210 shown in FIG. 9 are identical to steps 100 and 110 of FIG. 6, and thus their description is recited above. Thereafter, an average value AVE of the distances d1 to dn may be obtained, and 3σ may be obtained using the average value AVE (Step 220 of FIG. 9) using equation [2].

It should be noted that "σ" is a standard deviation and 3σ means a dispersion degree of the distances between the two dots of an associated dot pair from among a plurality of dot distances d1 to dn. Therefore, the greater the 3σ value, the more errors are present in the measured CD value. That is, as a dispersion of the distances between the two associated dots becomes large, a connection of the CD measurement dots becomes more non-smooth or dislocated.

After 3σ is obtained, it may be compared with a critical value (Step 230 of FIG. 9) selected by the operator. If 3σ is greater than the critical value, an error has occurred, and an error message may be displayed on the monitor (step 240 of FIG. 9) indicating that a connection of the CD measurement dots of the pattern is non-smooth or dislocated. In the alternative, if 3σ is equal to or less than the critical value, the measured data are acceptable to the operator, and the average value AVE and 3σ value may be displayed on the monitor (Step 250 of FIG. 9).

Figure 10:
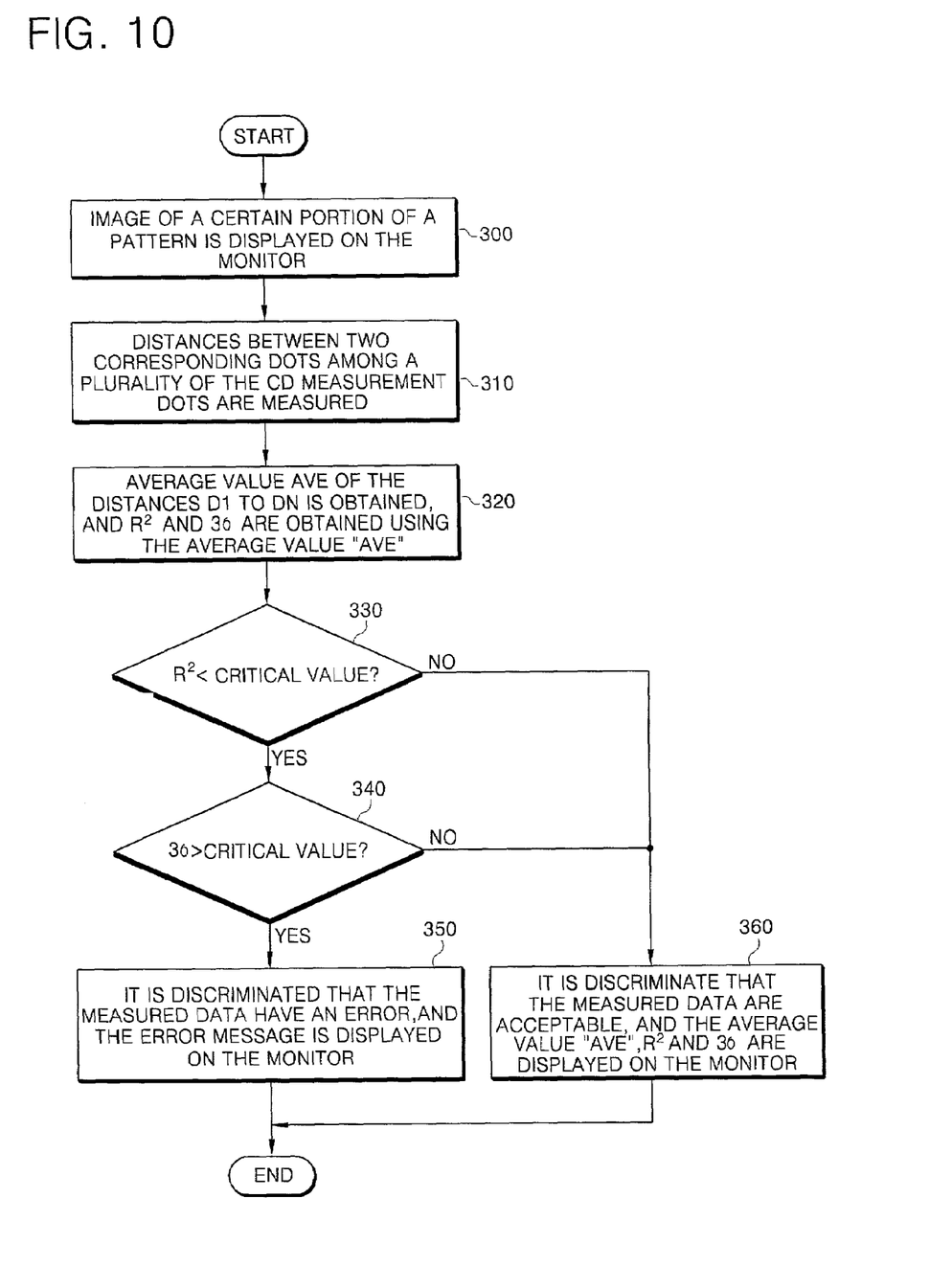
FIG. 10 illustrates a flow chart showing a method of detecting CD measurement errors according to a third preferred embodiment of the present invention.

FIG. 10 illustrates a flow chart showing a method of detecting CD measurement errors according to a third preferred embodiment of the present invention. Steps 300 and 310 of FIG. 10 are identical to the steps 100 and 110 of FIG. 6, and thus their description is recited above. Next, an average value AVE of the distances d1 to dn is obtained, and $R^2$ and 3σ are obtained using the average value AVE(Step 320 of FIG. 10). $R^2$ and 3σ are obtained by Equation [1] and Equation [2], respectively.

Subsequently, $R^2$ and 3σ are compared with respective critical values. $R^2$ may be compared with its critical value before 3σ is compared with its critical value, or 3σ may be compared with its critical value before $R^2$ is compared with its critical value.

In a case where $R^2$ is compared with its critical value before 3σ is compared with its critical value, $R^2$ may be compared with its critical value in Step 330 of FIG. 10. If $R^2$ is greater than or equal to its critical value, the measured data are acceptable to the operator, and the average value AVE and $R^2$ value may be displayed on the monitor (Step 360 of FIG. 10).

If $R^2$ is smaller than its critical value, 3σ may be compared to its critical value (Step 340 of FIG. 10). If 3σ is less than or equal to its critical value, the procedure goes to step 360 of FIG. 10. That is, the measured data are acceptable to the operator, and the average value AVE, $R^2$ and 3σ may be displayed on the monitor (Step 360 of FIG. 10). If 3σ is greater than its critical value, the measured data contains an error, and an error message may be displayed on the monitor (step 350 of FIG. 10) indicating that a connection of the CD measurement dots of the pattern is non-smooth or dislocated.

Figure 11A:
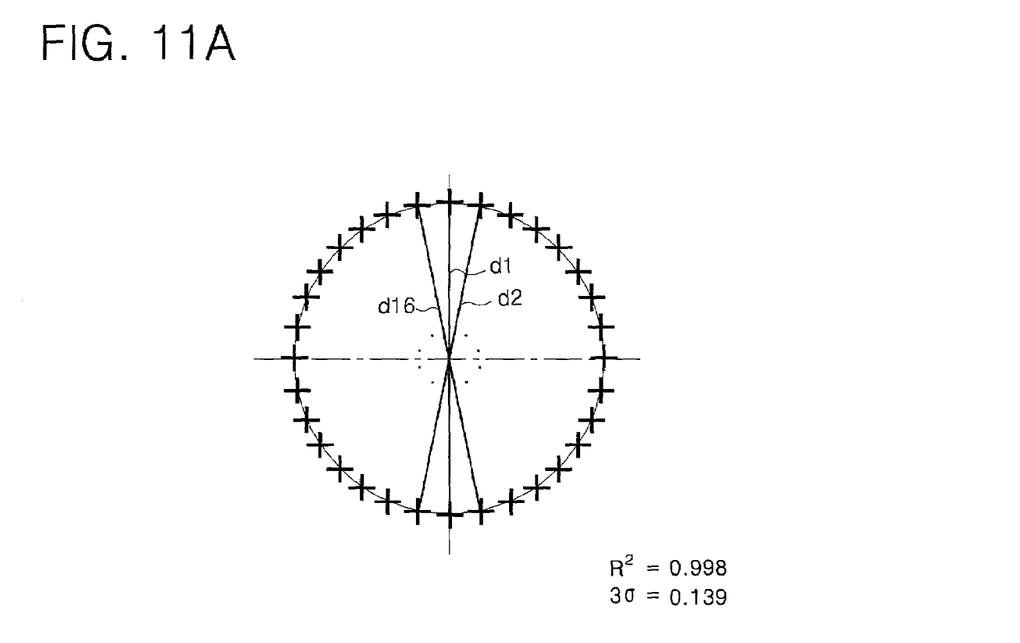
FIG. 11A shows an image of a contact hole pattern having no measurement errors.
Figure 11B:
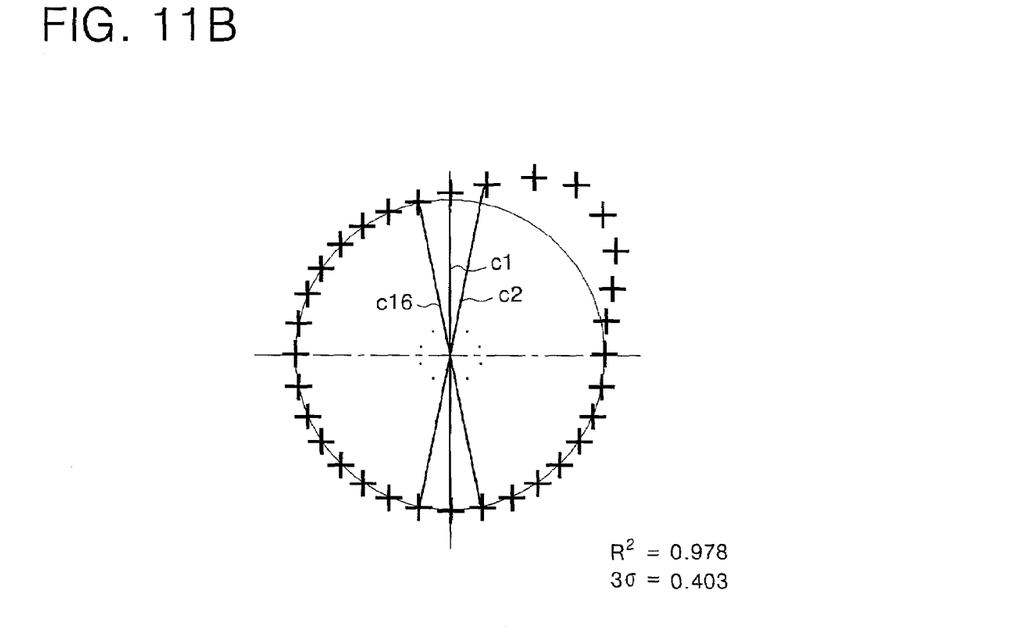
FIG. 11B shows an image of a contact hole pattern having measurement errors.

FIG. 11A shows an exemplary image of a contact hole pattern having no measurement errors, and FIG. 11B shows an exemplary image of a contact hole pattern having measurement errors. A connection of the CD measurement dots "+" shown in FIG. 11A is smooth, whereas a connection of the CD measurement dots "+" shown in FIG. 11B is non-smooth or dislocated.

$R^2$ and 3σ of the image shown in FIG. 11A, obtained using the distance d1 to d16, may be a representative 0.998 and 0.139, respectively, and $R^2$ and 3σ of the image of FIG. 11B obtained using the distance c1 to c16 can be 0.978 and 0.403, respectively. If an operator set critical values of $R^2$ and 3σ to an exemplary 0.990 and 0.200, respectively, $R^2$ and 3σ of the image of FIG. 11A are acceptable, but $R^2$ and 3σ of the image of FIG. 11B are determined to have measurement errors. Therefore, an average value (i.e., CD value), $R^2$, and 3σ shown in the image of FIG. 11A can be displayed on the monitor. However, in case of $R^2$ and $3\sigma$ shown in the image of FIG. 11B, an error message may be displayed on the monitor.

As previously described herein, the present invention has an advantage in that the measurement system is capable of automatically detecting the measurement error of a measured CD value, thereby increasing reliability of a measured CD value.

A preferred embodiment of the present invention has been disclosed herein and, although specific terms are employed, they are used in a generic and descriptive sense only and not for purpose of limitation. Accordingly, it will be understood by those of ordinary skill in the art that various changes in form and details may be made without departing from the spirit and scope of the invention as set forth in the following claims.

What is claimed is:

1. An automatic method of detecting measurement errors in a measurement system, comprising:
   a) imaging a pattern, the imaged pattern including a plurality of critical dimension measurement dots;
   b) measuring a plurality of distances between associated dot pairs from the plurality of the critical dimension measurement dots;
   c) calculating an average value using the plurality of distances;
   d) calculating a square value of trend analysis which represents $R^2$ as a statistical parameter of the plurality of distances using the average value; and
   e) detecting a non-smooth connection of the plurality of the critical dimension measurement dots using the square value of trend analysis $R^2$.

2. A method as claimed in claim 1, wherein the square value of trend analysis $R^2$ is obtained using the equation:

$$R^2 = 1 - \frac{\sum (di - AVE)^2}{\sum di^2 - \frac{(\sum di)^2}{n}}, i = 1, \ldots, n$$

wherein AVE is the average value and di is the distance between associated dot pairs.

3. A method as claimed in claim 1, wherein (e) includes setting a critical value and comparing the square value of trend analysis $R^2$ with the critical value.

4. A method as claimed in claim 3, wherein the non-smooth connection is detected when the square value of trend analysis $R^2$ is smaller than the critical value.

5. A method as claimed in claim 1, further comprising, either after or before (e), detecting the non-smooth connection of the plurality of the critical dimension measurement dot pairs using a standard deviation which represents $3\sigma$, where the standard deviation $3\sigma$ satisfies the equation:

$$3_\sigma = 3 \times \sqrt{\frac{\sum (di - AVE)^2}{n}}, i = 1, \ldots, n.$$

6. A method as claimed in claim 5, wherein (e) further includes setting respective critical values of the square value of trend analysis $R^2$ and standard deviation $3\sigma$, and comparing the square value of trend analysis $R^2$ and the standard deviation $3\sigma$ with the respective critical values.

7. A method as claimed in claim 6, wherein the non-smooth connection is detected when the square value of trend analysis $R^2$ is smaller than its critical value and the standard deviation $3\sigma$ is greater than its critical value.

8. An automatic method of detecting measurement errors in a measurement system, comprising:
   a) imaging a pattern, the imaged pattern including a plurality of critical dimension measurement dots;
   b) measuring a plurality of distances between associated dot pairs from the plurality of the critical dimension measurement dots;
   c) calculating an average value using the plurality of distances;
   d) calculating a square value of trend analysis which represents $R^2$ using the average value;
   e) detecting the non-smooth connection of the plurality of the critical dimension measurement dots using the square value of trend-analysis $R^2$, wherein the square value of trend analysis $R^2$ is obtained using the equation $$R^2 = 1 - \frac{\sum (di - AVE)^2}{\sum di^2 - \frac{(\sum di)^2}{n}}, i = 1, \ldots, n$$

wherein AVE is the average value and di is the distance between associated dot pairs.

9. An automatic method of detecting measurement errors in a measurement system, comprising:
   a) imaging a pattern, the imaged pattern including a plurality of critical dimension measurement dots;
   b) measuring a plurality of distances between associated dot pairs from the plurality of the critical dimension measurement dots;
   c) calculating an average value using the plurality of distances;
   d) calculating a standard deviation which represents $3\sigma$ using the average value;
   e) detecting the non-smooth connection of the plurality of the critical dimension measurement dots using the standard deviation $3\sigma$, wherein the standard deviation $3\sigma$ satisfies the equation $$3_\sigma = 3 \times \sqrt{\frac{\sum (di - AVE)^2}{n}}, i = 1, \ldots, n$$

wherein AVE is the average value and di is the distance between associated dot pairs.

10. A method as claimed in claim 9, wherein (e) includes setting a critical value and comparing the standard deviation $3\sigma$ with the critical value.

11. A method as claimed in claim 10, wherein the non-smooth connection is detected when the standard deviation $3\sigma$ is greater than the critical value.

12. An automatic method of detecting measurement errors in a measurement system, comprising:
   a) providing a measurement system including a computer and a scanning electron microscope, the computer including a function for measuring a critical dimension of a pattern;
   b) operating the computer to enable the scanning electron microscope to scan an electron beam over the pattern, so that secondary electrons are generated from the scanned portion of the pattern;
   c) detecting the generated secondary electrons to image and display the pattern on the computer, the imaged pattern on the computer including a plurality of critical dimension measurement dots;
   d) measuring a plurality of critical dimensions using distances between associated dot pairs from the plurality of the critical dimension measurement dots;

e) calculating a square value of trend analysis which represents $R^2$ parameter using the critical dimension; and
f) detecting the non-smooth connection of the plurality of the critical dimension measurement dots using the square value of trend analysis $R^2$, wherein the square value of trend analysis $R^2$ is calculated using the equation:

$$R^2 = 1 - \frac{\sum (di - AVE)^2}{\sum di^2 - \frac{(\sum di)^2}{n}}, i = 1, \ldots, n$$

wherein AVE is the average value and di is the distance between associated dot pairs.

13. A method as claimed in claim 12, wherein (f) includes setting a critical value and comparing the square value of trend analysis $R^2$ with the critical value.

14. A method as claimed in claim 13, wherein the non-smooth connection is detected when the square value of trend analysis $R^2$ is less than the critical value.

15. An automatic method of detecting measurement errors in a measurement system, comprising:
   a) providing a measurement system including a computer and a scanning electron microscope, the computer including a function for measuring a critical dimension of a pattern;
   b) operating the computer to enable the scanning electron microscope to scan an electron beam over the pattern, so that secondary electrons are generated from the scanned portion of the pattern;
   c) detecting the generated secondary electrons to image and display the pattern on the computer, the imaged pattern on the computer including a plurality of critical dimension measurement dots;
   d) measuring a plurality of critical dimensions using distances between associated dot pairs from the plurality of the critical dimension measurement dots;
   e) calculating a square value of trend analysis which represents $R^2$ parameter using the critical dimension; and
   f) detecting the non-smooth connection of the plurality of the critical dimension measurement dots using the square value of trend analysis $R^2$ wherein, either after or before (f), detecting the non-smooth connection of the plurality of the critical dimension measurement dots using a standard deviation which represents $3\sigma$, where the standard deviation $3\sigma$ satisfies the equation $$3_\sigma = 3 \times \sqrt{\frac{\sum (di - AVE)^2}{n}}, i = 1, \ldots, n.$$

16. A method as claimed in claim 15, wherein (f) further includes setting respective critical values of the square value of trend analysis $R^2$ and the standard deviation $3\sigma$ and comparing the square value of trend analysis $R^2$ and the standard deviation $3\sigma$ with the respective critical values.

17. A method as claimed in claim 16, wherein the non-smooth connection is detected when the square value of trend analysis $R^2$ is smaller than its critical value and the standard deviation $3\sigma$ is greater than its critical value.

18. A method as claimed in claim 16, wherein (f) further includes setting a critical value and comparing the standard deviation $3\sigma$ with the critical value.

19. A method as claimed in claim 18, wherein the non-smooth connection is detected when the standard deviation $3\sigma$ is greater than the critical value.

20. An automatic method of detecting measurement errors in a measurement system, comprising:
   a) providing a measurement system including a computer and a scanning electron microscope, the computer including a function for measuring a critical dimension of a pattern;
   b) operating the computer to enable the scanning electron microscope to scan an electron beam over the pattern, so that secondary electrons are generated from the scanned portion of the pattern;
   c) detecting the generated secondary electrons to create and display an image of the pattern on the computer, the imaged pattern on the computer including a plurality of critical dimension measurement dots;
   d) measuring a plurality of critical dimensions using distances between associated dot pairs from the plurality of the critical dimension measurement dots;
   e) calculating a square value of trend analysis which represents $R^2$ parameter using the critical dimension; and
   f) detecting the non-smooth connection of the plurality of the critical dimension measurement dots using the square value of trend analysis $R^2$, wherein the square value of trend analysis $R^2$ is calculated using the equation $$R^2 = 1 - \frac{\sum (di - AVE)^2}{\sum di^2 - \frac{(\sum di)^2}{n}}, i = 1, \ldots, n$$

wherein AVE is the average value and di is the distance between associated dot pairs.

21. An automatic method of detecting measurement errors in a measurement system, comprising:
   a) providing a measurement system including a computer and a scanning electron microscope, the computer including a function for measuring a critical dimension of a pattern;
   b) operating the computer to enable the scanning electron microscope to scan an electron beam over the pattern, so that secondary electrons are generated from the scanned portion of the pattern;
   c) detecting the generated secondary electrons to create and display an image of the pattern on the computer, the imaged pattern on the computer including a plurality of critical dimension measurement dots;
   d) measuring a plurality of critical dimensions using distances between associated dot pairs from the plurality of the critical dimension measurement dots;
   e) calculating a standard deviation which represents $3\sigma$ using the critical dimension; and
   f) detecting the non-smooth connection of the plurality of the critical dimension measurement dots using the standard deviation $3\sigma$ wherein the standard deviation $3\sigma$ satisfies the equation $$3_\sigma = 3 \times \sqrt{\frac{\sum (di - AVE)^2}{n}}, i = 1, \ldots, n$$

wherein AVE is the average value and di is the distance between associated dot pairs.

* * * * *